US011711157B2

(12) United States Patent
Mash et al.

(10) Patent No.: US 11,711,157 B2
(45) Date of Patent: *Jul. 25, 2023

(54) FULL-DUPLEX COMMUNICATION LINK USING TDM

(71) Applicant: MARVELL ASIA PTE LTD, Singapore (SG)

(72) Inventors: Christopher Mash, Harpenden (GB); Dance Wu, Palo Alto, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,674

(22) Filed: May 15, 2022

(65) Prior Publication Data

US 2022/0329336 A1 Oct. 13, 2022

Related U.S. Application Data

(63) Continuation of application No. 16/813,853, filed on Mar. 10, 2020, now Pat. No. 11,362,750.

(60) Provisional application No. 62/816,765, filed on Mar. 11, 2019.

(51) Int. Cl.
*H04J 3/06* (2006.01)

(52) U.S. Cl.
CPC .................................. *H04J 3/0647* (2013.01)

(58) Field of Classification Search
CPC .... H04J 3/0647; H04L 12/413; H04L 12/403; H04L 5/16; H04W 56/001; H04W 72/23; H04W 56/0015
See application file for complete search history.

(56) References Cited

U.S. PATENT DOCUMENTS

| 4,394,757 A * | 7/1983 | Muzumdar | H04Q 11/04 370/522 |
|---|---|---|---|
| 5,007,050 A * | 4/1991 | Kasparian | H04B 1/56 455/88 |
| 9,904,652 B2 * | 2/2018 | Sthoeger | G06F 13/423 |
| 9,992,038 B2 * | 6/2018 | Youngbull | H04W 76/27 |
| 2005/0041765 A1 * | 2/2005 | Dalakuras | G06F 13/4217 375/356 |
| 2005/0055469 A1 * | 3/2005 | Scheele | H04J 3/0664 710/1 |
| 2013/0308660 A1 * | 11/2013 | Huang | H04J 3/0682 370/518 |

(Continued)

*Primary Examiner* — Wutchung Chu

(57) ABSTRACT

An automotive communication system includes multiple communication devices and a processor. The communication devices are configured to be installed in a vehicle and to communicate with one another over point-to-point Ethernet links. In each Ethernet link, a first communication device serves as a link master that is configured to set a clock signal for the link, and a second communication device serves as a slave that is configured to synchronize to the clock signal set by the first communication device. The communication devices are configured to receive data from sensors and to transmit the data over the Ethernet links. The processor is configured to receive the data from the communication devices over the Ethernet links, to synchronize the data originating from the multiple sensors to a common time-base based on link-specific clock-signal synchronization achieved on each of the links by each link master, and to process the synchronized data.

12 Claims, 2 Drawing Sheets

(56) References Cited

U.S. PATENT DOCUMENTS

| | | | |
|---|---|---|---|
| 2014/0025999 A1* | 1/2014 | Kessler | H04B 3/56 710/110 |
| 2014/0101351 A1* | 4/2014 | Hooper | G06F 13/4256 710/110 |
| 2014/0379949 A1* | 12/2014 | Inazu | G06F 1/10 710/110 |
| 2016/0034416 A1* | 2/2016 | Chavez | G06F 13/364 381/59 |
| 2017/0084179 A1* | 3/2017 | Chen | B62D 15/0265 |
| 2017/0332068 A1* | 11/2017 | Schmollgruber | H04N 13/239 |
| 2018/0081030 A1* | 3/2018 | McMahon | A61B 5/08 |
| 2018/0259976 A1* | 9/2018 | Williams | G06Q 50/30 |
| 2020/0003862 A1* | 1/2020 | Doaré | H04L 7/065 |
| 2020/0042032 A1* | 2/2020 | Zhang | H04L 12/40013 |
| 2020/0158853 A1* | 5/2020 | Motos | G01S 13/765 |
| 2020/0374151 A1* | 11/2020 | Meier | H04L 12/4633 |

\* cited by examiner

FULL-DUPLEX COMMUNICATION LINK USING TDM

CROSS-REFERENCE TO RELATED APPLICATIONS

This application is a continuation of U.S. patent application Ser. No. 16/813,853, filed Mar. 10, 2020, which claims the benefit of U.S. Provisional Patent Application 62/816,765, filed Mar. 11, 2019. The disclosures of these related applications are incorporated herein by reference.

FIELD OF THE DISCLOSURE

The present disclosure relates generally to communication systems, and particularly to full-duplex communication and network synchronization using Ethernet™ links.

BACKGROUND

Various applications, such as automotive in-car communication systems, certain industrial communication systems and smart-home systems, require communication at high data rates over relatively small distances. Several types of protocols and communication media have been proposed for such applications. For example, Ethernet communication over twisted-pair copper wire media is specified in "IEEE 802.3bw-2015—IEEE Standard for Ethernet Amendment 1: Physical Layer Specifications and Management Parameters for 100 Mb/s Operation over a Single Balanced Twisted Pair Cable (100BASE-T1)," March, 2015.

The description above is presented as a general overview of related art in this field and should not be construed as an admission that any of the information it contains constitutes prior art against the present patent application.

SUMMARY

An embodiment that is described herein provides an automotive communication system including multiple communication devices and a processor. The communication devices are configured to be installed in a vehicle and to communicate with one another over a plurality of point-to-point Ethernet links. In each link among the Ethernet links, a respective first communication device serves as a link master that is configured to set a clock signal for the link, and a respective second communication device serves as a slave that is configured to synchronize to the clock signal set by the first communication device. The communication devices are configured to receive data from multiple sensors and to transmit the data over the Ethernet links. The processor is configured to receive the data from the communication devices over the Ethernet links, to synchronize the data originating from the multiple sensors to a common time-base based on link-specific clock-signal synchronization achieved on each of the links by each link master, and to process the synchronized data.

In some embodiments, in each link, the respective link master and the respective slave are configured to communicate over the link in a time-division multiplexing (TDM) protocol including master-to-slave transmission periods and slave-to-master transmission periods, while maintaining synchronization to the clock signal of the link master both during the master-to-slave transmission periods and during the slave-to-master transmission periods.

In an example embodiment, in each link, the respective slave is configured to: (i) during the master-to-slave transmission periods, lock a local oscillator of the slave on the clock signal of the link master, and (ii) during the slave-to-master transmission periods, transmit data using the local oscillator that was locked on the clock signal of the link master during the master-to-slave transmission periods.

In a disclosed embodiment, the processor is configured to construct a three-dimensional image from the data that originated from the multiple sensors, received over the multiple Ethernet links and synchronized to the common time-base. In another embodiment, the processor is configured to receive the data from at least two sensors over at least two separate Ethernet links. In yet another embodiment, the sensors include image sensors configured to acquire images of a scene, and the processor is configured to construct a three-dimensional model of at least part of the scene from the images.

There is additionally provided, in accordance with an embodiment that is described herein, a method for data processing in an automotive communication system. The method includes receiving data from multiple sensors in a plurality of communication devices installed in a vehicle. The data is communicated between the communication devices over a plurality of point-to-point Ethernet links to a processor, including, in each link among the Ethernet links, assigning a respective first communication device to serve as a link master that sets a clock signal for the link, and assigning a respective second communication device to serve as a slave that synchronizes to the clock signal set by the first communication device. In the processor, the data is received from the communication devices over the Ethernet links, the data originating from the multiple sensors is synchronized to a common time-base based on link-specific clock-signal synchronization achieved on each of the links by each link master, and the synchronized data is processed.

There is also provided, in accordance with an embodiment that is described herein, an industrial communication system including multiple communication devices and a processor. The communication devices are configured to communicate with one another over a plurality of point-to-point Ethernet links. In each link among the Ethernet links, a respective first communication device serves as a link master that is configured to set a clock signal for the link, and a respective second communication device serves as a slave that is configured to synchronize to the clock signal set by the first communication device. The communication devices are configured to receive data from multiple sensors and to transmit the data over the Ethernet links. The processor is configured to receive the data from the communication devices over the Ethernet links, to synchronize the data originating from the multiple sensors to a common time-base based on link-specific clock-signal synchronization achieved on each of the links by each link master, and to process the synchronized data.

There is further provided, in accordance with an embodiment that is described herein, a method for data processing in an industrial communication system. The method includes receiving data from multiple sensors in a plurality of communication devices. The data is communicated between the communication devices over a plurality of point-to-point Ethernet links to a processor, including, in each link among the Ethernet links, assigning a respective first communication device to serve as a link master that sets a clock signal for the link, and assigning a respective second communication device to serve as a slave that synchronizes to the clock signal set by the first communication device. In the processor, the data is received from the communication devices over the Ethernet links, the data originating from the multiple sensors is synchronized to a common time-base based on link-specific clock-signal synchronization achieved on each of the links by each link master, and the synchronized data is processed.

The present disclosure will be more fully understood from the following detailed description of the embodiments thereof, taken together with the drawings in which:

DETAILED DESCRIPTION OF EMBODIMENTS

Figure 1:
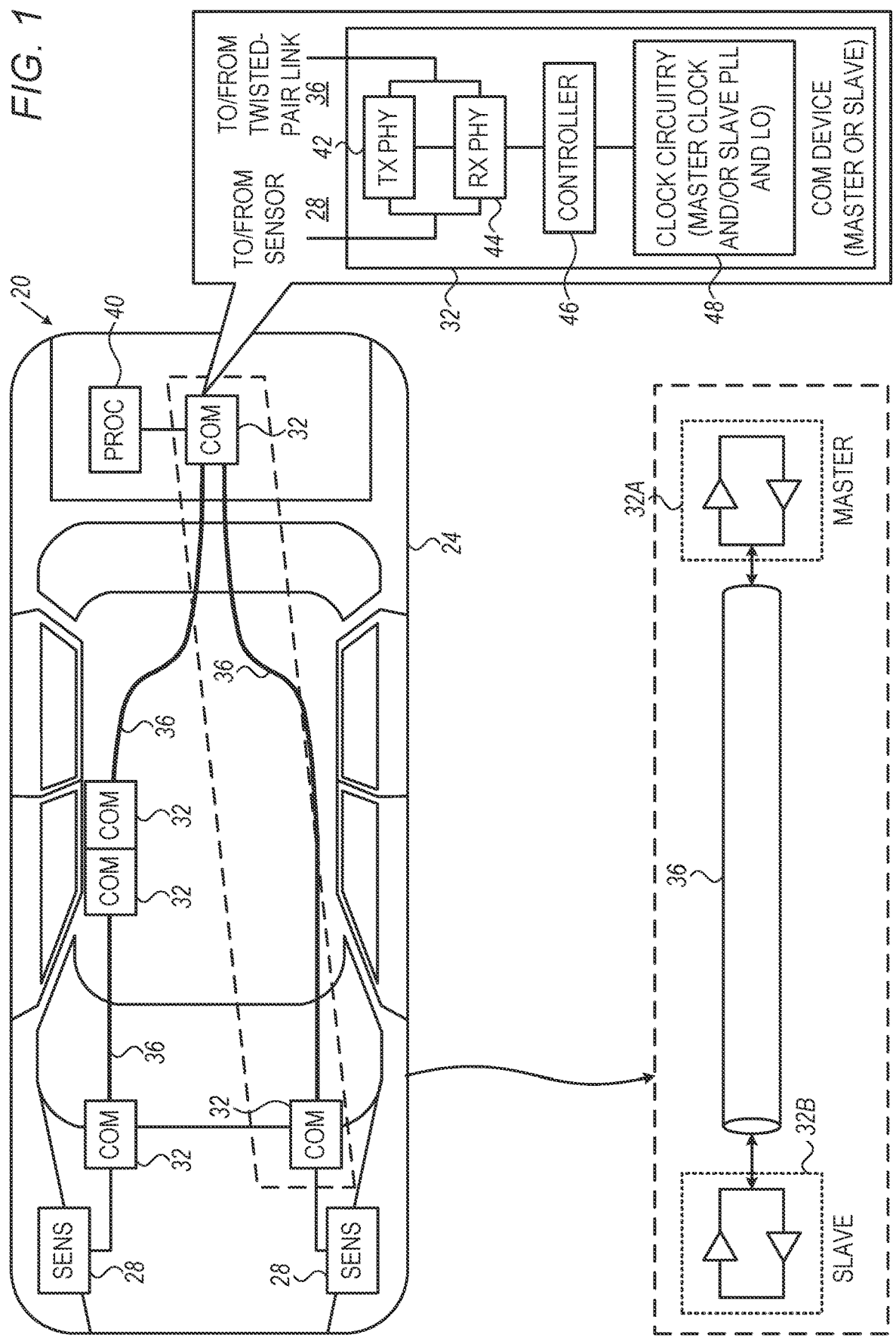
FIG. 1 is a block diagram that schematically illustrates an automotive communication system, in accordance with an embodiment that is described herein.

Embodiments that are described herein provide improved methods and systems for communication over Ethernet™ links. The embodiments described herein are described in the context of automotive applications, e.g., systems that collect data from sensors within a vehicle. This choice, however, is made solely for the sake of clarity. The disclosed techniques are equally applicable in other applications, for example in industrial and/or smart-home networks.

In some embodiments, an automotive communication system comprises multiple communication devices, also referred to as "PHY devices." The communication devices are configured to be installed in a vehicle and to communicate with one another over a plurality of point-to-point Ethernet links, e.g., twisted-pair links. At least some of the communication devices are connected to sensors fitted in the vehicle, e.g., cameras, radar sensors and the like. By communicating over the Ethernet links, the communication devices transfer data collected by the sensors to a central processor, and transfer control information from the processor to the sensors.

Unlike conventional Ethernet operation, however, in the disclosed embodiments each pair of communication devices connected by an Ethernet link communicate with one another in a Time-Division Multiplexing (TDM) protocol.

In an embodiment, in each link among the Ethernet links, one communication device serves as a link master, and the other communication device serves as a slave. The link master is configured to set (i) a clock signal for the link and (ii) timing of master-to-slave transmission periods and slave-to-master transmission periods in the TDM protocol over the link. The slave is configured to synchronize to the clock signal and to the TDM timing set by the link master. In setting the master-to-slave and slave-to-master transmission periods, in some embodiments the link master also sets an adjustable duty-cycle between the master-to-slave and slave-to-master link directions.

Although the disclosed TDM operation increases the instantaneous data rate over the Ethernet link, the fact that transmission is unidirectional at any given time simplifies the communication devices considerably. For example, conventional full-duplex operation over a twisted-pair link requires the use of hybrid combiners and complex echo cancellation circuitry in the Ethernet PHY devices. The disclosed TDM operation obviates the need for these elements, thereby reducing the size, cost and power consumption of the communication devices.

In some embodiments, the central processor receives the data produced by the multiple sensors and transferred by the multiple communication devices over the multiple Ethernet links. The processor is configured to synchronize the data originating from the various sensors to a common time-base, based on the link-specific synchronizations set on the links by the respective link master, and to process the synchronized data.

In one example embodiment, the sensors comprise image sensors, e.g., video cameras, which acquire two-dimensional (2-D) images of a scene in the vicinity of the vehicle. By synchronizing images from multiple image sensors to a common time-base, the processor is able to generate a three-dimensional (3-D) image or model of at least part of the scene. 3-D imaging or modeling of this sort provides valuable information such as distances to nearby objects.

FIG. 1 is a block diagram that schematically illustrates an automotive communication system 20, in accordance with an embodiment that is described herein. System 20 is installed in a vehicle 24, and comprises multiple sensors 28, multiple communication devices 32 that communicate over point-to-point Ethernet links 36, and a central processor 40.

In various embodiments, sensors 28 may comprise any suitable types of sensors. Several non-limiting examples of sensors comprise video cameras, velocity sensors, accelerometers, audio sensors, infra-red sensors, radar sensors, lidar sensors, ultrasonic sensors, rangefinders or other proximity sensors, and the like.

Communication devices 32 typically operate at least partially in accordance with one or more of the IEEE 802.3 Ethernet standards, e.g., the IEEE 802.3bw-2015, cited above. Since the techniques described herein pertain mainly to the physical layer, communication devices 32 are also referred to herein as "PHY devices." Nevertheless, in some embodiments communication devices 32 perform Medium Access Control (MAC) functions as well.

Depending on the applicable Ethernet standard, links 36 may comprise any suitable physical medium. In the embodiments described herein, although not necessarily, each link 36 comprises a single pair of wires, i.e., a single twisted-pair link. In alternative embodiments, links 36 may comprise single-ended wire links, not necessarily Ethernet compliant.

As seen in the figure, each link 36 is used for point-to-point communication between two communication devices 32. Communication devices 32 and links 36 are connected in a suitable topology so as to communicate with processor 40. In the example of FIG. 1, two of links 36 (at the top of the figure) are connected back-to-back, in which case data from a sensor 28 traverses two links 36 until reaching processor 40. A back-to-back configuration is useful, for example, when the two links 36 are fitted in two separate parts of vehicle 24. A third link 36 (at the bottom of the figure) connects the communication device that serves a sensor 28 directly to the communication device that serves processor 40. In various embodiments, one or more of communication devices 32 may be connected to sensors 28, and one or more other communication devices 32 may not be connected to sensors. In the present example, processor 40 is connected to a dedicated communication device 32. In other embodiments, the same communication device 32 may serve both processor 40 and a sensor 28. By the same token, a communication device may serve more than a single sensor 28. Further alternatively, any other suitable interconnection topology can be used for connecting sensors 28 and processor 40 using communication devices 32 and Ethernet links 36.

An inset at the bottom-left of FIG. 1 shows an example of two communication devices 32 that communicate over an Ethernet link 36. In some embodiments, in any pair of communication devices 32 that communicate over a respective link 36, one of the communication devices serves as a link master and the other serves as a slave. In the present example the link master is labeled 32A and the slave is labeled 32B.

On a given link 36, the master and the slave communicate in accordance with a Time-Division Multiplexing (TDM) protocol, which comprises interleaved master-to-slave transmission periods and slave-to-master transmission periods. During the master-to-slave transmission periods, the master transmits data over link 36 and the slave receives the data. During the slave-to-master transmission periods, the slave transmits data over link 36 and the master receives the data.

Since TDM means that only one communication device transmits at any given time, the instantaneous data rate has to be increased. For example, to support a throughput of 25 Gbps per direction, the instantaneous data rate (bandwidth) over link 36 should be at least 50 Gbps (and typically slightly higher, e.g., 52 Gbps, to allow for overhead).

In an example embodiment, the overall TDM period (i.e., one master-to-slave transmission period plus one slave-to-master transmission period) is on the order of one second. Alternatively, any other suitable period can be used.

In an example embodiment, the TDM duty-cycle (the ratio between the duration of the master-to-slave transmission period and the duration of the slave-to-master transmission period) is 0.5 (i.e., 50%/50%). In other embodiments, any other suitable duty-cycle can be used, e.g., 0.9 (90%/10%) or 0.1 (10%/90%). In some embodiments, the TDM duty-cycle is configurable and is set by the link master. The TDM duty-cycle can be set to different values for different links 36 (i.e., for different master-slave pairs).

An inset on the right-hand side of FIG. 1 shows the internal structure of communication device 32, in an embodiment. Communication device 32 comprises suitable interfaces for connecting to a sensor 28 (e.g., for receiving data acquired by the sensor and for transmitting control information to the sensor) and to an Ethernet link 36 (e.g., for transmitting the data received from the sensor and for receiving control information for the sensor).

In an embodiment, communication device 32 comprises transmission PHY (TX PHY) circuitry 42 that carries out various transmission tasks of the communication device, reception PHY (RX PHY) circuitry 44 that carries out various reception tasks of the communication device, a controller 46 that manages the communication device, and clock circuitry 48. In an embodiment, clock circuitry 48 comprises a clock oscillator and a Phase-Locked Loop (PLL).

In the present embodiment, communication device 32 is configurable to serve either as a link master or as a slave. The assumption is that, for each link 36, one communication device is pre-configured to serve as a link master and the other communication device is pre-configured to serve as a slave. This configuration can be performed, for example, by processor 40 on system initialization.

Controller 46 and clock circuitry 48 operate differently, depending on whether the communication device serves as a link master or as a slave. In a communication device 32 that operates as a link master, controller 46 typically sets the clock signal and the TDM protocol for the link. This setting comprises, for example, the TDM duty-cycle and the start/end times of the master-to-slave and slave-to-master transmission periods. When operating as a link master, the clock oscillator in clock circuitry 48 generates a clock signal for the link.

In a communication device 32 that operates as a slave, the communication device typically tracks and synchronizes to the clock signal and to the TDM protocol set by the link master. In a slave, RX PHY 44 receives the signal transmitted by the link master, and extracts the clock signal from the received signal. The PLL in clock circuitry 48 locks on the extracted clock signal, thereby synchronizing the local clock oscillator of the slave to the clock signal of the link master. In addition, controller 46 synchronizes to the TDM timing of the received signal, e.g., to the start and end times of the master-to-slave and slave-to-master transmission periods. The clock and/or timing synchronization between a link master and a slave is referred to herein as "link-specific synchronization" since it is specific to each link 36, and is typically performed separately by each master-slave pair.

The configurations of system 20 and its elements, such the internal structure of communication devices 32, as shown in FIG. 1, are example configurations that are depicted solely for the sake of clarity. In alternative embodiments, any other suitable configurations can be used. Elements that are not mandatory for understanding of the disclosed techniques have been omitted from the figure for the sake of clarity.

The different elements of system 20 and its various components, such processor 40 and communication devices 32, may be implemented using dedicated hardware or firmware, such as using hard-wired or programmable logic, e.g., in an Application-Specific Integrated Circuit (ASIC) or Field-Programmable Gate Array (FPGA). Additionally or alternatively, some functions, e.g., functions of processor 40 and/or of controllers 46, may be implemented in software and/or using a combination of hardware and software elements.

In some embodiments, processor 40 and/or controllers 46 comprise programmable processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Figure 2:
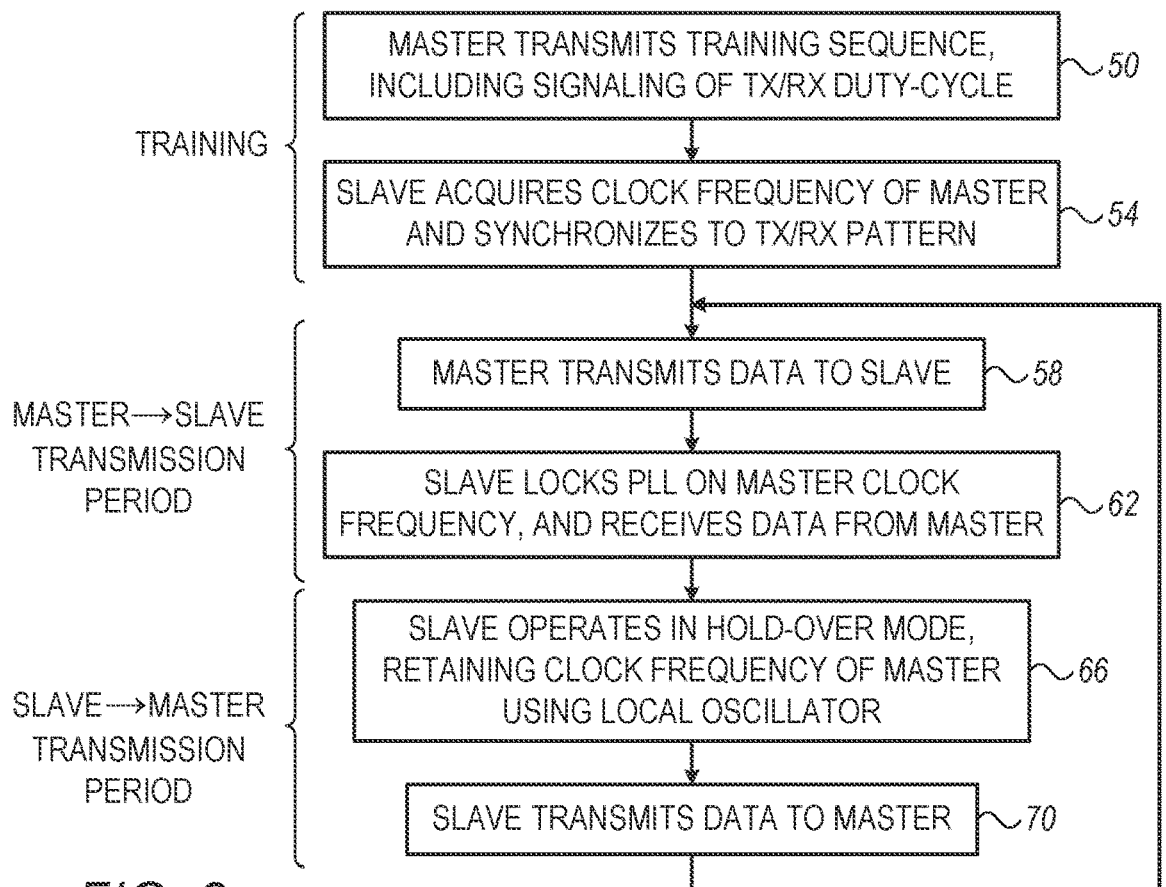
FIG. 2 is a flow chart that schematically illustrates a method for Time-Division Multiplexing (TDM) communication over an Ethernet link in the system of FIG. 1, in accordance with an embodiment that is described herein.

FIG. 2 is a flow chart that schematically illustrates a method for Time-Division Multiplexing (TDM) communication over an example point-to-point Ethernet link 36 in system 20 of FIG. 1 above, in accordance with an embodiment that is described herein. As seen in the figure, operation of the link can be viewed as a training stage, followed by an alternating sequence of master-to-slave transmission periods and slave-to-master transmission periods.

The method begins with the communication device 32 that serves as the link master transmitting a training sequence to the communication device 32 that serves as the slave, over link 36, at a training transmission operation 50. As part of the training sequence, or as separate signaling, the master notifies the slave of the TDM timing, e.g., the durations and start/end times of the master-to-slave and slave-to-master transmission periods. The TDM timing is also referred to as a "TX/RX pattern." At a training reception operation 54, the slave receives the training sequence from the master, acquires the master's clock signal by locking the PLL, and synchronizes to the TDM timing (TX/RX pattern) set by the master. At this stage, initial synchronization has been established, and the master and slave are ready to begin normal bidirectional communication.

At a master transmission operation 58, the master transmits data to the slave during a master-to-slave transmission period. At a slave reception operation 62, the slave retains its PLL locked on the master's clock signal, and receives the data sent from the master. At the end of the master-to-slave transmission period, the slave's local clock oscillator is locked on the clock frequency of the master's clock signal.

At this stage, in accordance with the TDM protocol, controllers 46 of the master and of the slave switch from master-to-slave transmission to slave-to-master transmission.

At a hold-over operation 66, the slave begins to operate in a hold-over mode. In this mode, the slave generates a clock signal from its local clock oscillator, but in a free-running manner that is not locked on any received signal. At a slave transmission operation 70, the slave transmits data to the master. For this transmission (and for the entire duration of the slave-to-master transmission period) the slave relies on the accuracy of its local clock oscillator, which was locked on the master's clock signal during the preceding master-to-slave transmission period.

At the end of the slave-to-master transmission period, controllers 46 of the master and of the slave switch from slave-to-master transmission to master-to-slave transmission. The method then loops back to master transmission operation 58 above.

With regard to time synchronization, the description up to this point referred mainly to link-specific synchronization, i.e., synchronization between the master and the slave over a particular Ethernet link 36. In some embodiments, central processor 40 of system 20 is configured to synchronize the data it receives from the various sensors 28 over the various Ethernet links 36 to a common time-base. Central processor 40 performs this global synchronization based on the link-specific synchronizations set on the various links 36 by the respective link masters.

Synchronizing the data of different sensors to a common time-base is important in various use-cases in the automotive environment. In one example embodiment, two or more of sensors 28 comprise image sensors, e.g., video cameras, which acquire 2-D images of the scene in the vicinity of vehicle 24. Processor 40 is configured to construct a 3-D image or model of at least part of the scene from the 2-D images provided by the image sensors. In order to construct a 3-D model or image, it is necessary that the acquisition times of the images from different image sensors be synchronized to a common time-base.

Figure 3:
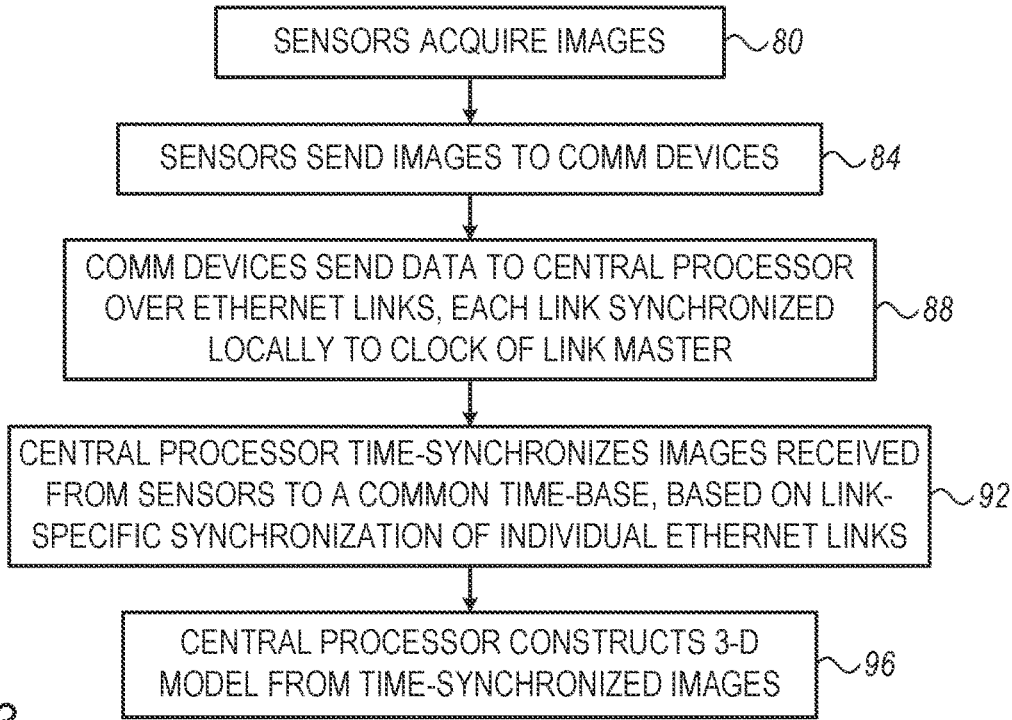
FIG. 3 is a flow chart that schematically illustrates a method for generating a three-dimensional model from automotive sensor images in the system of FIG. 1, in accordance with an embodiment that is described herein.

FIG. 3 is a flow chart that schematically illustrates a method for generating a three-dimensional model from images acquired by image sensors in system 20, in accordance with an embodiment that is described herein. The method begins with sensors 28 (image sensors in the present example) acquiring 2-D images, at an acquisition operation 80. At a sensor transmission operation 84, sensors 28 send the images to communication devices 32.

At a communication operation 88, communication devices 32 send the images over Ethernet links 36, finally reaching central processor 40. Communication over links 36 is performed using TDM, with the slave of each link being synchronized to the respective link master, as described above.

At a global synchronization operation 92, processor 40 synchronizes the images acquired by the various image sensors 28 to a common time-base, based on the link-specific synchronizations on the various links 36. At a model construction operation 96, processor 40 uses the globally-synchronized images to construct a 3-D model of at least part of the vicinity of vehicle 24.

The method flows of FIGS. 2 and 3 are example flows that are depicted solely for the sake of clarity. In alternative embodiments, any other suitable flows can be used. For example, in alternative embodiments processor 40 is configured to construct a 3-D model or image of the vicinity of vehicle 24 by fusing data from other types of sensors, not necessarily images. Such sensors may comprise, for example, proximity sensors, radar sensors or lidar sensors, or a mix of multiple types of sensors. In such embodiments, too, it is important to synchronize the data acquired by the various sensors to a common time-base.

Although the embodiments described herein mainly address automotive network communication systems, the methods and systems described herein can also be used in other applications, such as in industrial network communication systems that use Ethernet links to collect data from sensors and/or control various devices in an industrial environment, and in smart-home systems that collect data from, and control, home sensors and appliances.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An automotive communication link, comprising:
   a first communication device configured to serve as a master device of the automotive communication link; and
   a second communication device configured to serve as a slave device of the automotive communication link,
   wherein the first communication device and the second communication device are configured to be installed in a vehicle and to communicate with one another over a full-duplex point-to-point Ethernet link in a time-division multiplexing (TDM) protocol comprising unidirectional master-to-slave transmission periods and unidirectional slave-to-master transmission periods that are separate from the master-to-slave transmission periods, the slave device being configured to:
   during the master-to-slave transmission periods, lock a local oscillator of the slave device on a clock signal generated by the master device; and
   during the slave-to-master transmission periods, transmit data using the local oscillator that was locked on the clock signal of the master device during the master-to-slave transmission periods.

2. The automotive communication link according to claim 1, wherein the first communication device and the second communication device are configured to perform Ethernet physical-layer (PHY) functions.

3. The automotive communication link according to claim 1, wherein the full-duplex point-to-point Ethernet link is a single twisted-pair link.

4. The automotive communication link according to claim 1, wherein a ratio between durations of the master-to-slave transmission periods and durations of the slave-to-master transmission periods is different from 0.5.

5. The automotive communication link according to claim 1, wherein a ratio between durations of the master-to-slave transmission periods and durations of the slave-to-master transmission periods is greater than 0.75.

6. The automotive communication link according to claim 1, wherein a ratio between durations of the master-to-slave transmission periods and durations of the slave-to-master transmission periods is configurable.

7. A method for communication on an automotive communication link, the method comprising:
    operating a first communication device, in a vehicle, as a master device of the automotive communication link;
    operating a second communication device, in the vehicle, as a slave device of the automotive communication link;
    communicating between the first communication device and the second communication device over a full-duplex point-to-point Ethernet link in a time-division multiplexing (TDM) protocol comprising unidirectional master-to-slave transmission periods and unidirectional slave-to-master transmission periods that are separate from the master-to-slave transmission periods; and
    in the slave device:
        during the master-to-slave transmission periods, locking a local oscillator of the slave device on a clock signal generated by the master device; and
        during the slave-to-master transmission periods, transmitting data using the local oscillator that was locked on the clock signal of the master device during the master-to-slave transmission periods.

8. The method for communication according to claim 7, wherein operating the first communication device and the second communication device comprises performing Ethernet physical-layer (PHY) functions.

9. The method for communication according to claim 7, wherein communicating over the full-duplex point-to-point Ethernet link comprises communicating over a single twisted-pair link.

10. The method for communication according to claim 7, wherein a ratio between durations of the master-to-slave transmission periods and durations of the slave-to-master transmission periods is different from 0.5.

11. The method for communication according to claim 7, wherein a ratio between durations of the master-to-slave transmission periods and durations of the slave-to-master transmission periods is greater than 0.75.

12. The method for communication according to claim 7, wherein a ratio between durations of the master-to-slave transmission periods and durations of the slave-to-master transmission periods is configurable.

* * * * *